US008330438B2

(12) United States Patent
Sreenivas

(10) Patent No.: US 8,330,438 B2
(45) Date of Patent: Dec. 11, 2012

(54) METHOD AND APPARATUS FOR EQUALIZING PHASE CURRENTS IN MULTIPHASE SWITCHING POWER CONVERTERS

(75) Inventor: Venkat Sreenivas, Winchester, MA (US)

(73) Assignee: International Rectifier Corporation, El Segundo, CA (US)

( * ) Notice: Subject to any disclaimer, the term of this patent is extended or adjusted under 35 U.S.C. 154(b) by 1197 days.

(21) Appl. No.: 11/897,290

(22) Filed: Aug. 30, 2007

(65) Prior Publication Data

US 2009/0058379 A1   Mar. 5, 2009

(51) Int. Cl.
G05F 1/46 (2006.01)
G05F 1/56 (2006.01)
G05F 1/563 (2006.01)
G05F 1/565 (2006.01)

(52) U.S. Cl. .................. 323/272; 323/283; 323/285
(58) Field of Classification Search .................. 323/241, 323/322, 271, 282–285, 272; 363/65
See application file for complete search history.

(56) References Cited

U.S. PATENT DOCUMENTS

| | | | | |
|---|---|---|---|---|
| 2,832,925 | A * | 4/1958 | Koll et al. | 318/768 |
| 6,052,297 | A * | 4/2000 | Akamatsu et al. | 363/84 |
| 6,285,571 | B1 * | 9/2001 | Brooks et al. | 363/65 |
| 6,404,175 | B1 * | 6/2002 | Yang et al. | 323/282 |
| 6,465,993 | B1 * | 10/2002 | Clarkin et al. | 323/272 |
| 6,515,460 | B1 * | 2/2003 | Farrenkopf | 323/272 |
| 6,670,794 | B1 * | 12/2003 | Wang et al. | 323/213 |
| 6,795,009 | B2 * | 9/2004 | Duffy et al. | 341/155 |
| 7,301,314 | B2 * | 11/2007 | Schuellein et al. | 323/272 |
| 2003/0227988 | A1 * | 12/2003 | Subrahmanyan et al. | 375/372 |
| 2006/0239046 | A1 * | 10/2006 | Zane et al. | 363/65 |
| 2007/0013350 | A1 * | 1/2007 | Tang et al. | 323/237 |
| 2007/0064456 | A1 * | 3/2007 | Schuellein | 363/65 |
| 2007/0096703 | A1 * | 5/2007 | Jain | 323/282 |
| 2008/0157742 | A1 * | 7/2008 | Martin et al. | 323/284 |

OTHER PUBLICATIONS

Abu-Qahouq, et al, "Novel Control Method for Multiphase Low-Voltage High-Current Fast Transient VRM's," PESC 2002, vol. 4, pp. 1576-1581.

* cited by examiner

Primary Examiner — Jeffrey Sterrett
Assistant Examiner — Nusrat Quddus
(74) Attorney, Agent, or Firm — Chapin IP Law, LLC

(57) ABSTRACT

A method and apparatus for equalizing phase currents in multiphase switching power converters is described in which pairs of stored digital values that directly or indirectly control the values of the currents in the conversion phases are altered in equal and opposite increments. In one embodiment the digital values being controlled are the relative on-times of the power switches in pairs of conversion phase. The method is stepwise and repetitive in the sense that, instead of calculating or inferring offset values that seek to bring all of the currents in the phases toward equality, pairs of phase currents are altered repetitively and iteratively, using equal and opposite steps in the values of their respective control variables, until the phases are all sufficiently close in value. The steps may be of fixed size or the step size may be selectively modified to optimize the convergence time of the algorithm.

23 Claims, 4 Drawing Sheets

METHOD AND APPARATUS FOR EQUALIZING PHASE CURRENTS IN MULTIPHASE SWITCHING POWER CONVERTERS

FIELD OF INVENTION

The present invention generally relates to equalizing of phase currents in multiphase switching power converters. More particularly, the present invention relates to digital means for equalizing phase currents in multiphase switching power converters.

BACKGROUND

Multiphase switching power converters ("multiphase converters") comprise a plurality of switching power conversion phases that are controlled to operate in a parallel, interleaved, fashion, enabling delivery of high current at low output voltage with low output voltage ripple. In such converters, output voltage ripple may be reduced by closely matching the average phase currents; power density also improves with improved current sharing among phases because the phases may all be operated at, or close to, their maximum power rating without risk of inductor saturation.

Multiphase switching power converters and prior art apparatus and methods for enforcing current sharing among phases in multiphase converters are described in Abu-Qahouq et al, "Novel Control Method for Multiphase Low-Voltage High-Current Fast-Transient VRMs," PESC 2002, Volume 4, pp. 1576-1581: Brooks et al, U.S. Pat. No. 6,285,571, Sep. 4, 2001, "Method and Apparatus for an Efficient Multiphase Switching Regulator"; Farrenkopf, U.S. Pat. No. 6,515,460, Feb. 4, 2003, "Multiphase Switching Regulator Control Architecture for Low On Time Systems that Enforces Current Sharing"; and in Yang and Guo, U.S. Pat. No. 6,404,175, Jun. 11, 2002, "Multi-Phase and Multi-Module Power Supplies With Balanced Current Between Phases and Modules."

SUMMARY

Conventional multiphase voltage converter circuits suffer from a number of deficiencies. For example, each of multiple phases in a conventional multiphase converter circuit typically has different circuit characteristics due to variations in the electronic components that make up a respective phase of the power converter circuit. Thus, during operation, different power converter phase circuits in a multiphase circuit can deliver different amounts of current to a respective load even when each of the phases is driven with the same switch duty cycle (e.g., the same pulse width modulation switch control signal).

Techniques discussed herein deviate with respect to conventional applications such as those discussed above as well as other techniques known in the prior art. For example, certain embodiments herein are directed to improving current sharing in a multiphase power converter circuit so that an amount of current delivered by each phase to a respective load is more equal.

More specifically, embodiments herein include a system, apparatus, method, etc. to monitor an amount of current that each of multiple power converter phases delivers to a load. Based on monitoring the amount of current, a controller selects a pair of power converter phases from the multiple power converter phases. As an example of selecting, the controller can select, from the multiple power converter phases, a first power converter phase to be included in the pair in response to detecting that the first power converter phase delivers a lowest amount of current to the load amongst the multiple power converter phases. The controller can select, from the multi power converter phases, a second power converter phase for inclusion in the pair in response to detecting that the second power converter phase delivers a highest amount of current to the load amongst the multiple power converter phases.

As an alternative to selecting phases providing minimum and maximum current to the load, note that the controller can use other criteria to select which phases will be included in the pair of phases whose output current will be modified.

After selecting a pair of phases (e.g., a group of multiple phases) for adjustment, the controller modifies a digital variable associated with the first power converter phase (of the selected pair of power converter phases) to decrease an amount of current delivered by the first power converter phase to the load. The controller also modifies a digital variable associated with a second power converter phase (of the selected pair of power converter phases) to increase an amount of current delivered by the first power converter phase to the load.

In one embodiment, modifying the digital variable associated with the first power converter phase reduces the amount of current delivered by the first power converter phase by an amount substantially equal to an amount of additional current provided by the second power converter phase as a result of modifying the digital variable associated with the second power converter phase. Accordingly, the effect of decrementing the digital variable associated with the first power converter phase (and reducing a respective amount of phase current provided to the load by the first power converter phase) can cancel out the effect of incrementing the digital variable associated with the second power converter phase (and increasing a respective amount of phase current provided to the load by the second power converter phase).

As described herein, the process of monitoring (e.g., sampling) and adjusting the phases can be repeated over time to enhance current sharing amongst the phases. For example, an amount of current delivered to a respective load by each of multiple phases may initially vary greatly depending on circuit parameters. Embodiments herein can include repeatedly modifying (over successive measurement cycles) amounts of current delivered by each phase to the load to be more equal with each other so that the burden of providing current to a load is more equally shared.

As discussed above, techniques herein are well suited for use in multiphase switching power supply converter circuitry. However, it should be noted that embodiments herein are not limited to use in such applications and that the techniques discussed herein are well suited for other applications as well.

Note also that each of the different features, techniques, configurations, etc. discussed herein can be executed independently or in combination with any or all other features also described herein. Accordingly, the present invention can be embodied, viewed, and claimed in many different ways.

This summary section does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION OF EXAMPLE EMBODIMENTS

Figure 1:
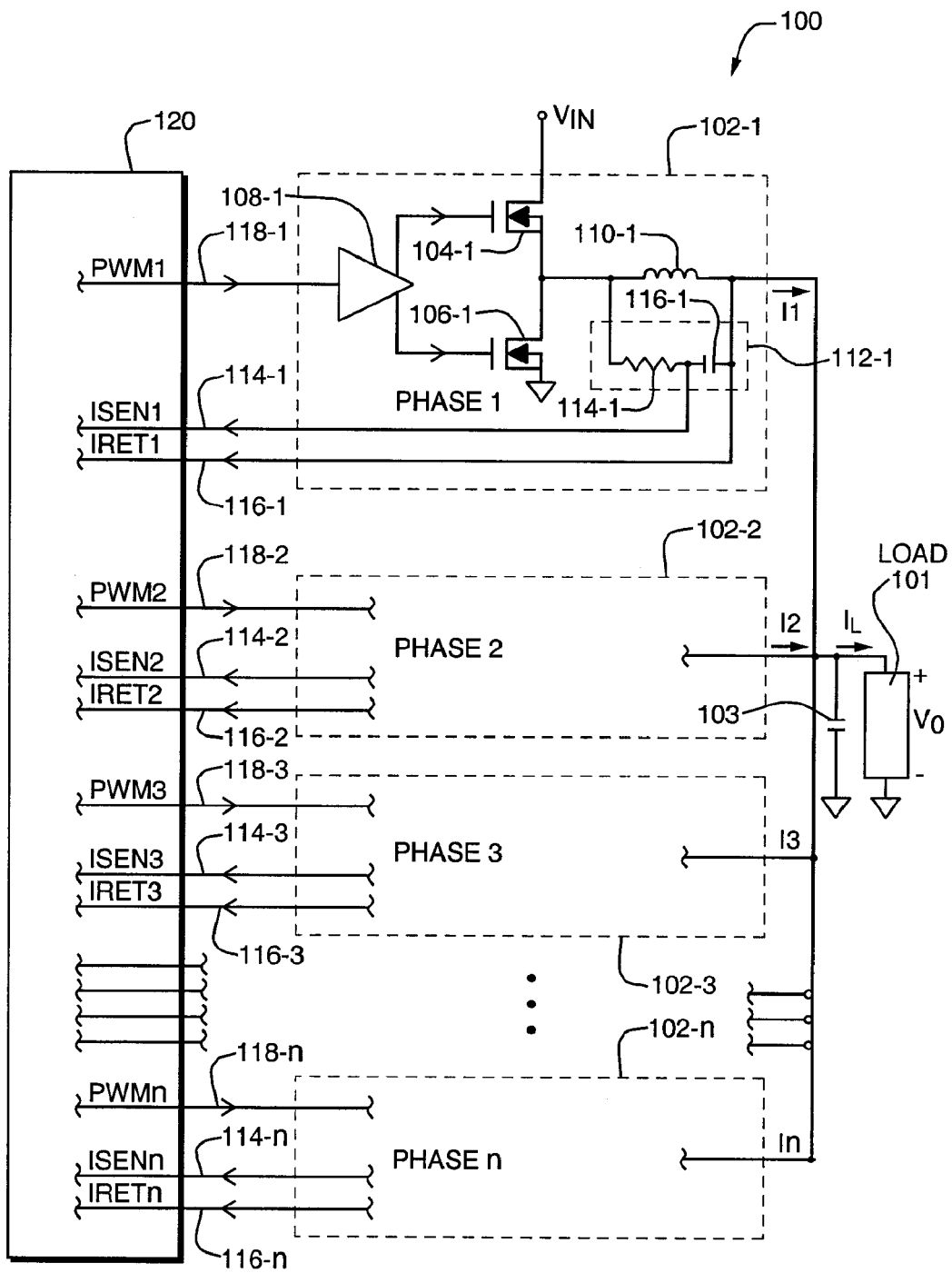
FIG. 1 shows a partial schematic of a multiphase power converter according to embodiments herein.

FIG. 1 shows a partial schematic of a multiphase power converter 100. The converter 100 receives power from an input voltage source, $V_{in}$, and delivers power to a load 101 at a load voltage $V_o$ and a load current $I_L$. The load may be bypassed by filter capacitance 103. As illustrated in FIG. 1, the total average current delivered to the load, $I_L$, by the multiphase converter is the sum of the average phase currents, $I_1, I_2, I_3 \ldots I_n$.

The multiphase converter 100 comprises a total of n conversion phases 102-1 ... 102-n, where n is greater than one. Conversion Phase 1 102-1 is shown in the figure to be a conventional buck switching power converter comprising a power switch 104-1, synchronous switch 106-1, inductor 110-1 and switch driver circuit 108-1. All of the remaining phases 102-2, 102-3 ... 102-n are essentially identical to phase 1. It is understood that the use of the buck conversion topology in FIG. 1 is for illustrative purposes and that the conversion phases may be any of a wide variety of isolated and non-isolated power conversion topologies.

A multiphase controller 120 sends signals PWM1 118-1, PWM2 118-2, PWM3 118-3 ... PWMn 118-n to the driver circuits 108-1 ... 108-n in the conversion phases. The PWM signals control the durations of the on and off times of the switches in the phases 102-1 ... 102-n as a means of regulating the converter output voltage, $V_o$, to a pre-determined value. In general, when signal PWMx is enabled by controller 120, the power switch 104-x in conversion phase 102-x will be turned on and synchronous switch 106-x will be turned off; when signal PWMx is disabled by controller 120, the power switch 104-x will be turned off and synchronous switch 106-x will be turned on. Although each PWM signal is shown to consist of a single signal line, it is understood that a PWM signal may actually consist of several signal lines: e.g. a signal line to control the state of the power switch; a signal line to control the state of the synchronous switch; a signal line to disable both switches. In steady-state operation, the multiphase controller 120 interleaves the on times of the power switches 104-1 ... 104-n within each converter operating cycle and controls the phase shift between the on times of the switches to be essentially equal.

As also shown in FIG. 1, each phase comprises a current sense circuit 112-1 ... 112-n for delivering a current sense signal, indicative of the magnitude of the current flowing in the phase inductor 110-1 ... 110-n, to controller 120. In the figure, each current sense signal appears as the difference in voltage between its differential sense and return signal lines (e.g., sense signal line Isen1 114-1 and return signal line Iret1 116-1 for phase 1; sense signal line Isen2 114-2 and return signal line Iret2 116-2 for phase 2). Although inductor DCR current sensing circuits 112-1 ... 112-n (see, e.g., Huang et al, "Inductors Allow Loss-Less Current Sensing in Multiphase DC-DC Converters," PCIM Magazine, June 2001, pp. 58-67) are shown in FIG. 1, it is understood that they are illustrative and that other means of current sensing may be used.

It is desirable that the average values of the phase currents $I_1 \ldots I_n$ be equal, as this may minimize the converter output ripple and maximize the power density of the converter 100. In an ideal converter, with all components in each phase being ideal and perfectly matched, and the duty cycles of all of the switches also being equal and perfectly matched, the average currents delivered by each phase will also be equal. In practice, components are not ideal and switches and switch drivers have rise and fall times that are finite and variable; these and other environmental and physical effects alter the relative values of the currents delivered by each phase. Furthermore, the PWM pulse width of a selected phase, or selected phases, may be altered in response to load current transients, resulting in phase current imbalances. It is therefore desirable to take steps to enforce essentially equal current sharing among the phases.

Figure 2:
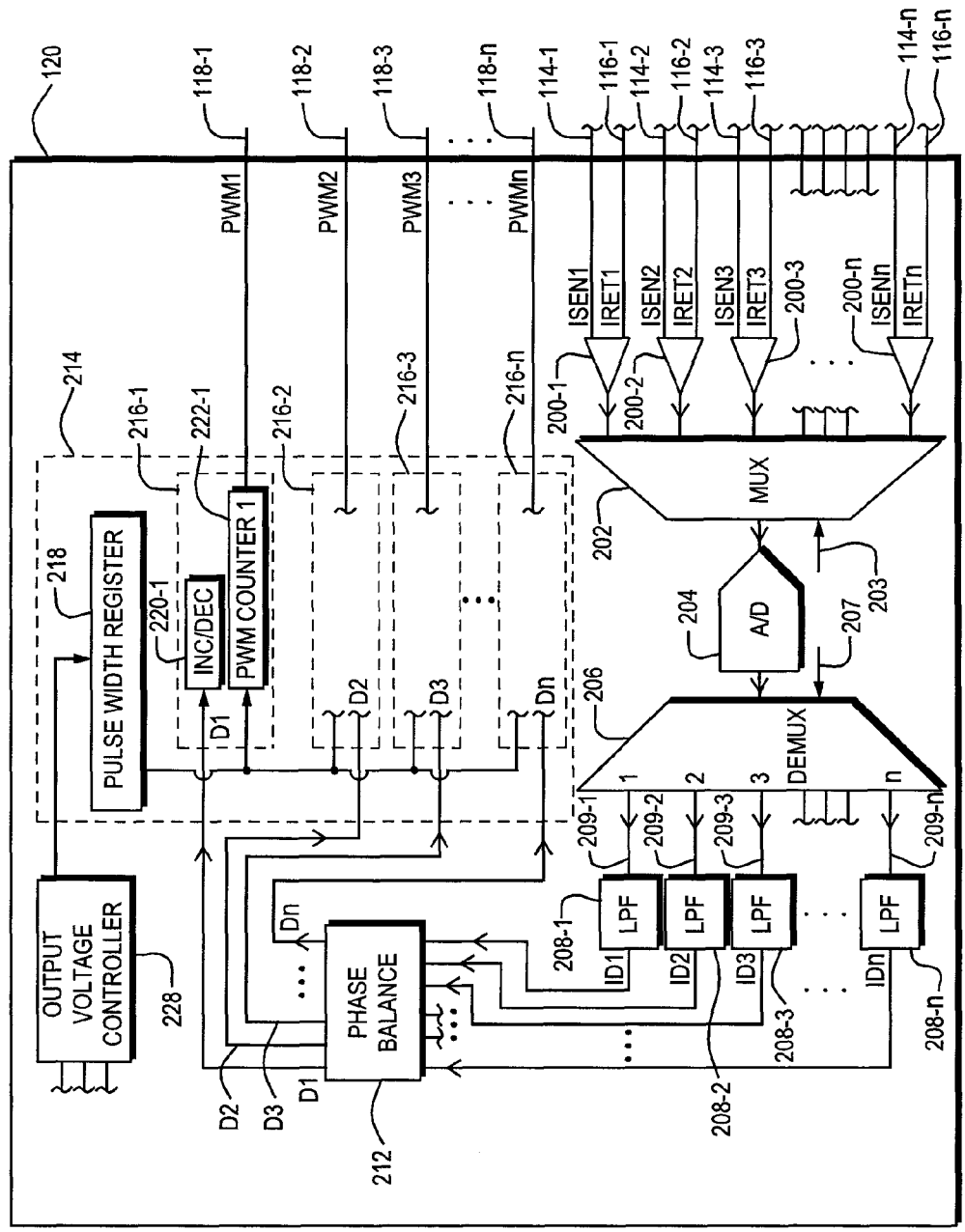
FIG. 2 shows a block schematic diagram of a portion of a multiphase controller, comprising apparatus for equalizing the average values of the currents delivered by the phases, according to embodiments herein.

FIG. 2 shows a block schematic diagram of a portion of the multiphase controller 120 of FIG. 1, comprising apparatus for equalizing the average values of the currents delivered by the phases. In the figure, an output voltage controller 228 delivers a nominal pulse width value, $PWM_o$, to a pulse width register 218 in PWM controller 214. The PWM controller 214 also comprises a pulse width adjustment apparatus 216-1 ... 216-n for each conversion phase 102-1 ... 102-n. Each pulse width adjustment apparatus comprises an Inc/Dec register 220-1 ... 220-n that receives a respective PWM pulse width adjustment value, $D_1 \ldots D_n$, from phase current equalization apparatus 212 (described below). The values $D_1 \ldots D_n$ are added or subtracted from $PWM_o$ to set an adjusted pulse width value in PWM Counters 222-1 ... 222-n. As described below, by appropriate adjustment of $D_1 \ldots D_n$, the pulse widths $PWM_1 \ldots PWM_n$ 118-1 ... 118-n delivered to the phases may be individually altered to balance the relative values of the average currents in each phase toward equality.

In FIG. 2, phase current digitizing circuitry comprises difference amplifier-buffers 200-1 ... 200-n; analog multiplexer 202; A/D converter 204; and digital demultiplexer 206. Current sense signals from each phase are delivered to the inputs of difference amplifier-buffers 200-1 ... 200-n via sense signal lines 114-1 ... 114-n and return signal lines 116-1 ... 116-n, previously described. During each converter operating cycle, of duration T, the analog multiplexer takes a sample of the current in each phase, with essentially equal time delay between samples (i.e., delay=T/n). For example, each phase sample may be taken just before its respective power switch is turned on, or a sample may be taken after a fixed delay has elapsed following the turning off of a phase switch. In this way, each of the samples is taken under approximately the same instantaneous operating conditions within its respective phase. The analog sample from a selected phase is delivered by the multiplexer to the input of the A/D converter 204; the digitized output signal from the A/D converter is passed to the input of the digital demultiplexer 206. The address lines of the multiplexer and demultiplexer 203, 207 are synchronized so that the digitized value of the sampled current from phase 1 is delivered as a first digital output 209-1 from the demultiplexer; the digitized value of the sampled current from phase 2 is delivered as a second digital output 209-2 from the demultiplexer; and so on. Each digital phase current output 209-1 ... 209-*n* is delivered to a respective low pass filter ("LPF") 208-1 ... 208-*n*, whose bandwidth is set to be substantially lower (e.g., typically more than an order of magnitude lower) than operating frequency, $f_o=1/T$, of the converter. The averaged, digitized values of the phase currents, $I_{D1} \ldots I_{Dn}$, are sent to phase current equalization apparatus 212.

Figure 3:
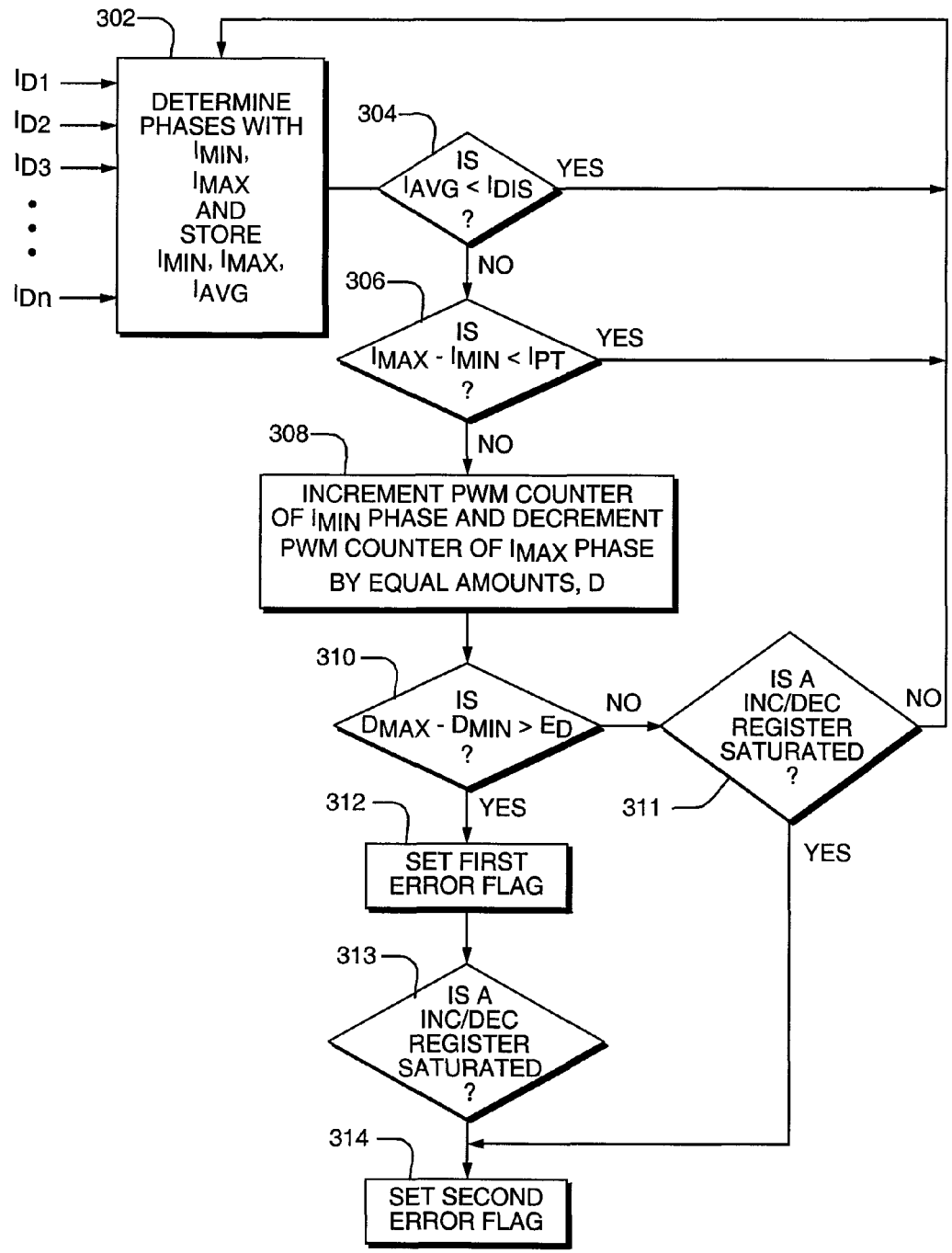
FIG. 3 is a logic flow diagram of an algorithm for equalizing phase currents in a multiphase controller, according to embodiments herein.

With reference to the logic flow diagram of FIG. 3, the phase current equalization apparatus adjusts the pulse width of the PWM signals in a stepwise and repetitive fashion as a means of equalizing the average currents delivered by each phase, in accordance with the following algorithm:

1. The phases with the minimum average phase current, $I_{MIN}$, and maximum average phase current, $I_{MAX}$, are identified; the average of all of the average phase currents, $I_{AVG}$, is computed; and $I_{MIN}$, $I_{MAX}$ and $I_{AVG}$ are stored (step 302).

2. If $I_{AVG}$ is less than a pre-determined disable threshold, $I_{DIS}$, no adjustments are made (step 304). This avoids introducing errors in equalizing owing to possible inaccuracies in phase current measurements at low currents. The pre-determined threshold may be a programmable value.

3. If $I_{AVG}$ is above $I_{DIS}$, the algorithm may first determine whether the difference between the maximum average phase current, $I_{MAX}$, and the minimum average phase current, $I_{MIN}$, is below a minimum phase current error threshold, $I_{PT}$ (step 306). If the difference is below $I_{PT}$, no adjustments are made. If the difference is greater than $I_{PT}$, the PWM counter of the phase with the lowest current is incremented by an amount, D, and the PWM counter of the phase with the highest current is decremented by the same amount, D (step 308). Since the increment in one of the phase currents is the same as the decrement in the other, the sum of the two currents will be approximately unchanged, as will the load current (any small difference being compensated for by the voltage control loop). The amount, D, by which the PWM counters are incremented and decremented in step 308 may be a fixed value (e.g., 1 count, 5 counts) or it may be a value that is calculated (e.g., based upon the difference between $I_{MAX}$ and $I_{MIN}$; based upon the value of $I_{AVG}$).

4. The pulse width increments and decrements for each phase, $D_1 \ldots D_n$, are accumulated in a respective Inc/Dec register. If the difference between the maximum and minimum values stored in the Inc/Dec registers, $D_{MAX}$ and $D_{MIN}$, is greater than an error threshold, $E_D$, or if one of the Inc/Dec registers is saturated (reaches full scale) one or more error flags may be set (steps 310-314). Either of these conditions may be indicative of a problem with the converter and the respective error flag may be used to signal a fault condition and/or shut down the converter. An error flag may also be used to identify a phase that cannot be equalized so that the system may disable only that phase and continue to operate (with reduced capability).

Figure 4:
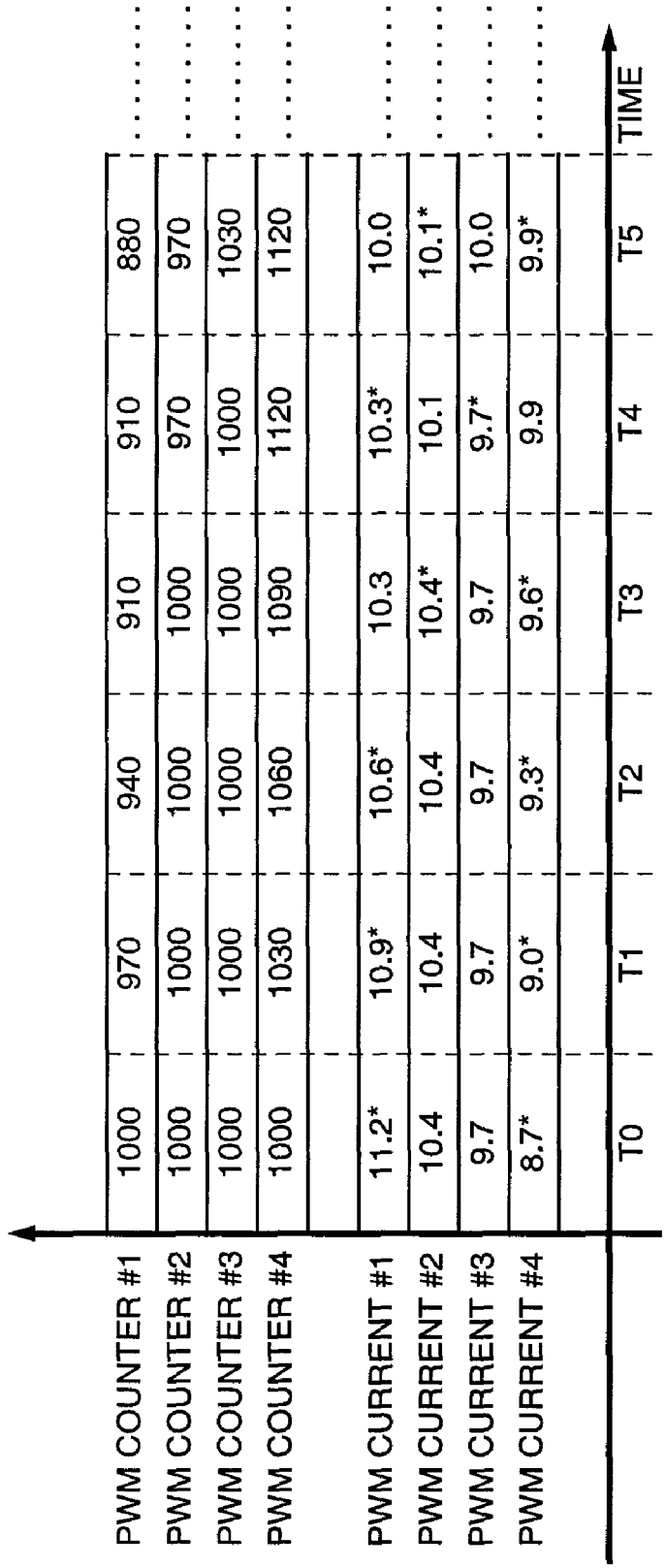
FIG. 4 is a timing diagram illustrating operation of the algorithm of FIG. 3.

FIG. 4 is a timing diagram illustrating operation of the algorithm of FIG. 3 for a converter comprising four conversion phases. In FIG. 4, both the PWM Counter and (filtered) Phase Current values (e.g., Id1-Id4, FIG. 2) for each of the four phases are plotted as a function of time. During a first time interval, To, each PWM Counter starts off with a value of 1000, corresponding to equal switch timing signals being sent to each conversion phase. As shown in FIG. 4, these initially equal values in the PWM Counters result in unbalanced Phase Currents that vary from a minimum value of 8.7 Amperes (Phase #4) to a maximum of 11.2 Amperes (Phase #1), the total delivered current (i.e., the sum of all the Phase currents) being equal to 40 Amperes. In the example that follows we assume: (1) that the increment/decrement amount, D, is equal to 30 and that. for these particular converter operating conditions, a value of D=30 results in a nominal change in phase current equal to 0.3 Amperes; (2) that the minimum phase current error threshold, $I_{PT}$ (step 306), is equal to 0.3 Amperes; (3) that step 304 in FIG. 3 is not true (i.e., that the average value of the total current delivered by all of the phases is not less than a threshold value, $I_{DIS}$); and (4) that the error condition in step 310 in FIG. 4 is not true (i.e., that the divergence between Inc/Dec Registers never exceeds an error threshold, $E_D$).

As illustrated in FIG. 4, each filtered Phase Current is sampled and stored (step 302, FIG. 3) during time interval To and the minimum and maximum values of the filtered Phase Currents are determined (the maximum and minimum phase current values are marked with and asterisk in FIG. 4). During time interval To, Phase Current #1 is the maximum current (11.2 Amperes) and Phase Current #2 is the minimum Phase Current (8.7 Amperes). Processing the Phase Current values through Step 308 of FIG. 3 results in PWM Counter #1 being incremented by D=30 and PWM Counter #4 being decremented by D=30 resulting. As a result, during the next interval T1, Phase Current #1 declines by 0.3 Ampere, and Phase Current #4 increases by 0.3 Ampere. The algorithm is processed again during time interval T1, resulting, once again, in PWM Counter #1 being decremented and PWM Counter #2 being incremented, with the results appearing in the next time interval T2. This process continues throughout time periods T3, T4 and T5. During time period T5, the difference between the maximum and minimum Phase Currents has been reduced to 0.1 Ampere, which is below the minimum phase current error threshold, $I_{PT}$=0.3 Ampere. As a result, the test at step 306 (FIG. 3) is true and incrementing and decrementing of PWM counters is suspended (until some later time when the test at step 306 is no longer true).

It is understood that the preceding example is idealized and for illustrative purposes and that in a practical power converter: (1) a particular increment or decrement, D, in a value contained in a PWM Counter, may not result in equal changes in phase currents in different phases; and (2) The change in a phase current in a particular phase may not be proportional to a change in the value in its PWM counter. FIG. 4 also shows a change in a PWM Counter value during a time interval being fully reflected as a change in a corresponding Phase Current during the same time interval. It is understood that is for illustration and that in a practical converter there may be a time delay between a change in a PWM Counter and the full effect of the change on its corresponding Phase Current.

In general, the algorithm comprises altering, in equal and opposite increments (e.g., digital steps), pairs of stored digital values that directly or indirectly affect the values of the currents in the phases. In the example above, the digital values being controlled are the relative on-times of the power switches in the conversion phases. Other control variables may be selected, however, depending on the topology of the conversion phases and the specific embodiment of the controller and its means of interfacing to the phases. The algorithm is stepwise and repetitive in the sense that, instead of calculating or inferring offset values that seek to bring all of the currents in the phases toward equality, pairs of phase currents are altered repetitively and iteratively, using equal and opposite increments in the values of their respective control variables, until the phases are all sufficiently close in value. The increments may be of fixed size or the size of the increment may be selectively modified to optimize the convergence time of the algorithm.

The flow diagram of FIG. 3 is meant to be explanatory and illustrative, but is not meant to imply temporal relationships between logical processes or process steps, imply that the processes are performed independently of other processes (e.g., the output voltage control process) or in any particular order relative to any other process. As described herein some or all of both the portion of the multiphase controller shown in FIG. 2 and the phase equalizing algorithm of FIG. 3 may be implemented as hardware or as software code and/or logical instructions that are processed by a digital processor or other means, or a combination of both. The logical processes may run concurrently or sequentially with respect to each other or with respect to other processes, such as measurement processes, voltage regulation processes and related calculations. Controllers may be implemented in mixed-signal circuitry; in circuitry comprising mixed-signal circuitry comprising a digital processor core; or in circuitry comprising a combination of mixed-signal circuitry and a separate digital signal processor. They may be implemented as an integrated circuit or a hybrid device. There may also be additional steps associated with the phase equalizing algorithm. Pre-determined values, such as the disable threshold and the minimum phase current error threshold, may be stored in read-only or re-programmable non-volatile memory.

The phase equalizing apparatus and algorithm for multiphase converters is simple, requires low gate count and, in integrated circuit form, relatively little silicon area. Since the algorithm is performed digitally, it does not introduce any additional error other than quantization errors which may be kept small. The approach may incorporate built in fault monitoring for reporting if an imbalance between phase currents exceeds (programmable) thresholds. The approach is flexible, because different power converter applications may be addressed by changing register values in an on-chip memory. Also, since the approach looks at relative values of phase currents, and does not compare the phase currents to some computed or inferred "target" current, it is immune to the offset in the A/D converter 204.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A multiphase switching power converter comprising:
   a group including at least three switching power conversion phases that are activated to provide current to a load, each power conversion phase in the group delivering a portion of the current delivered to the load, each power conversion phase in the group having a respective digital control variable for altering current delivered by a respective phase to the load, and
   a phase current equalization apparatus configured to:
      while controlling at least one power converter phase in the group to deliver a same amount of current to the load as delivered in a previous phase control cycle, alter, via opposite adjustments, digital control variables associated with each of a first power converter phase and a second power converter phase in the group to adjust a magnitude of current delivered to the load by each of the first power converter phase and the second power converter phase toward equality;
      the phase current equalization apparatus suspending altering of the digital control variables if a difference between the maximum and the minimum current is below a predetermined threshold.

2. The multiphase switching power converter of claim 1 in which a value of a respective digital control variable is indicative of an on-time of a switch in a respective power conversion phase.

3. The multiphase switching power converter of claim 1, wherein the first power converter phase delivers a lowest amount of current to the load amongst multiple power converter phases in the group that deliver current to the load; and
   wherein the second power converter phase delivers a highest amount of current to the load amongst the multiple power converter phases in the group that deliver current to the load.

4. The multiphase switching power converter of claim 1, wherein the phase current equalization apparatus is configured to alter the digital control variables over multiple phase control cycles.

5. The multiphase switching power converter of claim 1 in which the values of the currents are average values.

6. A multiphase switching power converter comprising:
   a group including at least three switching power conversion phases that are activated to provide current to a load, each power conversion phase in the group delivering a portion of the current delivered to the load, each power conversion phase in the group having a respective digital control variable for altering current delivered by a respective phase to the load, and
   a phase current equalization apparatus configured to:
      while controlling at least one power converter phase in the group to deliver a same amount of current to the load as delivered in a previous phase control cycle, alter, via opposite adjustments, digital control variables associated with each of a first power converter phase and a second power converter phase in the group to adjust a magnitude of current delivered to the load by each of the first power converter phase and the second power converter phase toward equality;
      the multiphase switching power converter including a controller, the controller being a voltage controller for controlling the output voltage of the multiphase switching power converter, wherein the phase current equalization apparatus alters the digital control variables by storing digital offsets for each phase and adjusting a nominal pulse width modulation control value using the digital offsets.

7. The multiphase switching power converter of claim 2 wherein a power conversion phase is a buck switching power converter.

8. The multiphase switching power converter of claim 1 in which the phase current equalization apparatus is configured to suspend altering of the digital control variables if the average current delivered to the load is below a predetermined threshold.

9. The multiphase switching power converter of claim 6 in which the phase current equalization apparatus is configured to set an error flag if a difference between a largest and smallest of the digital offsets is below a predetermined threshold.

10. The multiphase switching power converter of claim 6 in which the phase current equalization apparatus is configured to set an error flag if at least one of the digital offsets is above a predetermined threshold.

11. The multiphase switching power converter of claim 6 in which the offsets are altered by the opposite increments.

12. A method for controlling currents provided by multiple power converter phases towards equality, the method comprising:
- selecting, amongst the multiple power converter phases, a pair of power converter phases to be adjusted;
- altering, via opposite adjustments, stored digital variables, the stored digital variables controlling magnitudes of current provided to a load by the selected pair of power converter phases;
- wherein altering the stored digital variables includes:
  - adjusting a digital variable associated with a first power converter phase in the selected pair to increase, by a given amount, current supplied by the first power converter phase to power the load; and
  - adjusting a digital variable associated with a second power converter phase in the selected pair to reduce, by the given amount, current supplied by the second power converter phase to the load.

13. The method of claim 12 wherein the step of altering comprises:
- repetitively identifying, among a group of power converter phases, a given pair of phases that deliver minimum and maximum phase currents to the load; and
- altering values of the stored digital variables associated with the given pair of power converter phases to balance current provided to the load by each power converter phase in the pair.

14. The method of claim 13 further comprising:
- incrementing a stored digital value that controls current in a power converter phase delivering the minimum phase current to the load.

15. The method of claim 12 further comprising:
- controlling a magnitude of output current, as supplied to the load by a third power converter phase, to be unchanged while adjusting the current supplied by the first power converter phase and adjusting the current supplied by the second power converter phase.

16. The method of claim 12 in which the step of altering stored digital variables comprises altering a digital value that is indicative of an on-time of a switch in a power conversion phase.

17. A method comprising:
- monitoring a magnitude of current that each of multiple power converter phases delivers to a load;
- from the multiple power converter phases, selecting a pair of power converter phases that deliver unequal amounts of current to the load, the selected pair of power converter phases including a first power converter phase and a second power converter phase, the first power converter phase delivering more current to the load than and the second power converter phase;
- for the selected pair of power converter phases, adjusting currents delivered by the first power converter phase and the second power converter phase towards equality including:
  - modifying a digital variable associated with a first power converter phase of the selected pair of power converter phases to decrease an amount of current delivered by the first power converter phase to the load; and
  - modifying a digital variable associated with a second power converter phase of the selected pair of power converter phases to increase an amount of current delivered by the first power converter phase to the load.

18. A method as in claim 17, wherein selecting the pair of power converter phases includes:
- selecting the first power converter phase in response to detecting that the first power converter phase delivers a highest amount of current to the load amongst the multiple power converter phases; and
- selecting the second power converter phase for inclusion in the pair in response to detecting that the second power converter phase delivers a lowest amount of current to the load amongst the multiple power converter phases.

19. A method as in claim 18, wherein modifying the digital variable associated with the first power converter phase reduces the amount of current delivered by the first power converter phase by an amount substantially equal to an amount of additional current provided by the second power converter phase as a result of modifying the digital variable associated with the second power converter phase.

20. The method as in claim 17 further comprising:
- in a first phase control cycle in a sequence of multiple phase control cycles in which the multiple power converter phases deliver the current to the load:
  - controlling the first power converter phase to deliver current to the load according to a first setting;
  - controlling the second power converter phase to deliver current to the load according to a second setting;
  - controlling a third power converter phase of the multiple power converter phases to deliver current to the load according to a third setting;
- in a second phase control cycle in the sequence following the first phase control cycle:
  - decreasing a magnitude of current delivered by the first power converter phase to the load;
  - increasing a magnitude of current delivered by the second power converter phase to the load; and
  - controlling the third power converter phase of the multiple power converter phases to supply a same amount of current as delivered by the third power converter phase in the first phase control cycle.

21. The method as in claim 20 further comprising:
- in a third phase control cycle in the sequence following the second phase control cycle:
  - increasing the magnitude of current delivered by the second power converter phase to the load;
  - decreasing a magnitude current delivered by the third power converter phase to the load; and
  - controlling the second power converter phase of the multiple power converter phases to supply a same magnitude of current to the load as was delivered by the second power converter phase in the second phase control cycle.

22. A method comprising:
- based on a magnitude of current that each of multiple power converter phases delivers to a load, selecting a pair of power converter phases from the multiple power converter phases for being adjusted;
- for the selected pair of power converter phases:
  - modifying a digital variable associated with a first power converter phase of the selected pair of power converter phases to decrease an amount of current delivered by the first power converter phase to the load; and
  - modifying a digital variable associated with a second power converter phase of the selected pair of power converter phases to increase an amount of current delivered by the first power converter phase to the load; the method further comprising:
- generating a value indicative of a difference in current delivered to the load by the first power converter phase and the second power converter phase;
- comparing the value to a threshold value;

wherein modifying the digital variable associated with the first power converter phase reduces an amount of current delivered by the first power converter phase to the load; and wherein modifying the digital variable associated with the second power converter phase increases an amount of current delivered by the first power converter phase to the load.

23. The method as in claim 1, wherein the opposite adjustments are substantially equal and opposite adjustments that:

increase current delivered to the load by the first power converter phase by a given amount; and decrease current delivered to the load by the second power converter phase by the given amount.

\* \* \* \* \*